March 16, 1943.          W. P. LOWTHER          2,313,883
SHEET METAL CLAMP
Filed April 17, 1942

INVENTOR.
Wm. P. Lowther
BY
*[signature]*
ATTORNEYS

Patented Mar. 16, 1943

2,313,883

UNITED STATES PATENT OFFICE 2,313,883

SHEET METAL CLAMP

William P. Lowther, Inglewood, Calif.

Application April 17, 1942, Serial No. 439,309

3 Claims. (Cl. 85—5)

This invention relates to sheet metal clamps such as are employed for detachable engagement with overlapping sheet metal plates to clamp said plates in close relationship with each other prior to riveting; and such as are now used in large quantities in airplane factories to clamp together the metal skin plates of the airplane.

The principal objects of my invention are to provide a clamp for the purpose which may be used with thick or thin plates, or in other words in a short or long bore, with equal facility and efficiency; one which may be started or initially locked in the bore without being first unlocked; one which may be easily operated under all conditions and whether dry or oiled; one constructed so that the clamping or tensioning spring will not fly out should a locking element break, and thus provides a valuable safety feature; one in which the operating friction is reduced to a minimum so as not to interfere with the full and proper functioning of the locking elements and tension spring; and one so constructed that failure due to breakage of the locking element or other part is extremely unlikely, wear is held to a minimum, and repairs or replacement of any part may be easily effected if necessary.

These objects I accomplish by means of such structure and relative arrangement of parts as will fully appear by a perusal of the following specification and claims.

In the drawing similar characters of reference indicate corresponding parts in the several views.

Figure 1:
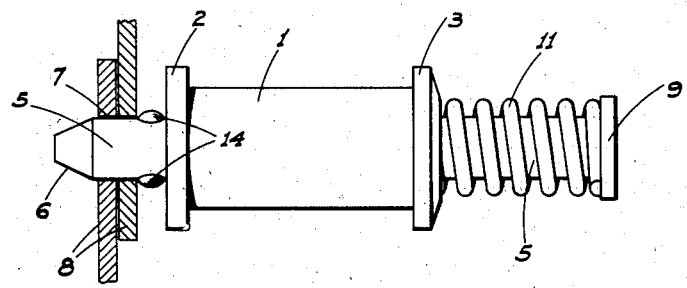
Figure 1 is a longitudinal enlarged elevation of my improved clamp in its normal contracted position and showing the stem started in the bore of the plates to be clamped.

Referring now more particularly to the characters of reference on the drawing, the clamp comprises a cylindrical body 1 having an enlarged flange 2 at its forward end, and with said end forming a work engaging head. At its other or rear end, the cylinder is provided with an enlarged tool-engaging flange 3. At said forward end, the body is bored as at 4 to slidably receive a stem 5 which projects beyond both ends of the body. At its forward end the stem is tapered or blunt-pointed as at 6 to permit of ready entry into the bore 7 of the plates 8 to be clamped. At its other or rear end, the stem is provided with an enlarged head 9. The bore 7 is of a predetermined size for a certain size rivet, and the stem is accordingly of a size to slidably fit this bore.

The bore 4 in the body is relatively short, and the body, from the rear end of the bore 4 to the rear end of the body, is formed with an enlarged bore 10 to receive a heavy compression spring 11. This spring surrounds the stem between the head 9 and a transversely split washer 12 seated in the body at rear end of the bore 4.

Figure 3:
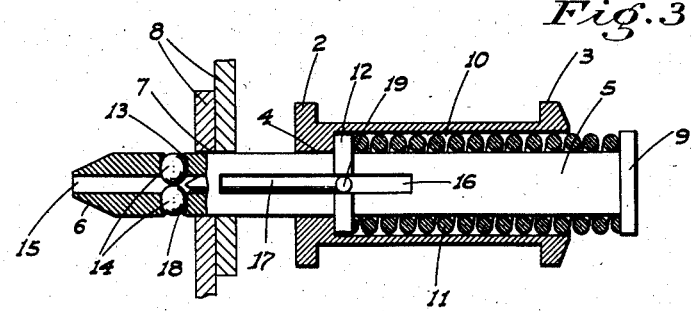
Figure 3 is a similar view showing the spring compressed, the locking elements retracted, and the stem projected through the plates to its locking position.
Figure 4:
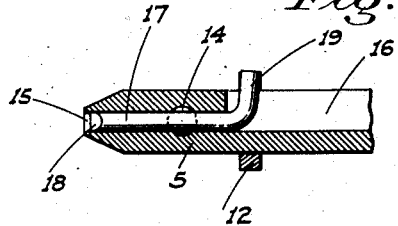
Figure 4 is a fragmentary longitudinal section of the stem detached.

The forward portion of the stem, rearwardly of the taper 6 but outside the body, is provided with a transverse bore 13 for a pair of short round-end detents or locking members 14, which are prevented from escape from said bore by the fact that the latter is headed over its outer ends as is common practice with detents of this type. The heading-over thus obviously allows the detents to project radially from the stem a distance materially less than the radius of the round end of the detents, so that the work is always engaged by the curving ends of the detents, a feature which aids in a retracting movement of the detents when the tool is being withdrawn. The detents are of such length that when retracted in the stem and contacting each other, they do not project beyond the periphery of the stem as shown in Fig. 3.

The stem is provided with an axial bore 15 extending rearwardly from its forward end to a point rearwardly of the detent-bore, and at its rear end joining a longitudinal slot 16 cut into the stem. The detent spreading pin 17, wedge-shaped at its forward end as at 18, is slidable in the bore 15 and terminates at its rear end in a radial extension 19 riding in the slot 16 and projecting between the split ends of the washer 12, as shown, so that it will be engaged by the adjacent end of the spring.

The parts above described are proportioned so that when the forward end of the head 2 alines with the rear end of the bore 13, the forward end of the pin 17 will be ahead of said bore. The extension 19, however, remains as always alined with the washer 12, which likewise always remains in the inner end of the bore 4, due to the constant spring pressure thereagainst. The detents are thus naturally separated by the pin 17 and thus project from the stem as shown in Figs. 1 and 2, preventing further expansion of the spring and retraction of the forward end portion of the stem into the body.

Figure 2:
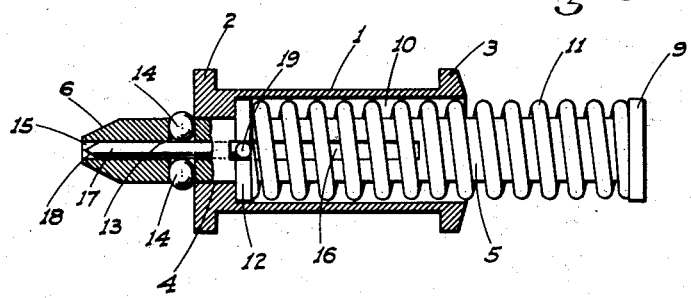
Figure 2 is a sectional elevation of the clamp with the parts as in Fig. 1.

Likewise the stem can then only project through the bore 7 of the plates 8 to a limited extent or until the outermost plate engages the projecting detents as shown in Fig. 1. Such extent, however, is amply sufficient to initially locate the stem in place. To enable the stem to be moved to a clamping position, or so that the detents will be disposed beyond the inner plate 8, the head 9 and flange 3 are drawn together by a tool of the type commonly used in connection with clamps of this general nature. This operation compresses the spring and pulls the body along the stem toward the rear end of the latter. At the same time, since the extension 19 of the spreading pin is engaged with the body at the rear end of the bore 4, the pin will be moved rearwardly in the stem so that it finally clears the detents as shown in Fig. 3.

This allows the detents to move radially inward in the stem, and since the normally projecting portion of the detents presents a flat curvature to the adjacent plate 8, a slight advancing pressure on the stem is sufficient to move the detents inwardly when they are clear of the pin. This stem may then be projected through the plate bore until the detents are beyond the inner plate, when the spring compressing pressure of the operating tool may be released. The body then moves relatively forward until the head 2 engages the outer plate 8, but before this takes place the pin 17 will have slid between and spread the detents so that they again project from the stem and prevent retractive movement thereof. The plates are thus firmly clamped between the detents and the head 2, and as long as the pin 17 remains advanced, it is impossible for the detents to be depressed from their holding position.

When it is desired to release the lock and remove the clamp, it is only necessary to again apply the tool and withdraw the pin 17 from between the detents. Again only a small retracting pull on the stem is necessary to cause the detents to be depressed into the stem so that the latter can pass through the bore 7.

The use of detents of the form described, rather than actual balls, prevents possible sticking when entering or leaving the bore in the work, and reduces the size of the stem bore to a minimum, so that undue weakening of the stem is avoided. Also, this form of detent prevents possible outward rolling of the same when used in a long bore.

From the foregoing description it will be readily seen that I have produced such a device as substantially fulfills the objects of the invention as set forth herein.

While this specification sets forth in detail the present and preferred construction of the device, still in practice such deviations from such detail may be resorted to as do not form a departure from the spirit of the invention, as defined by the appended claims.

Having thus described my invention, what I claim as new and useful and desire to secure by Letters Patent is:

1. In a clamp for sheet metal work, a body adapted at its head end for engagement with the work, a stem adapted at its forward end to slidably extend through and fit a bore in the work projecting from said end of the body and slidable therein, a spring resisting relative extending of the body and stem, a locking element mounted in the stem outside the body for radial movement and adapted when fully retracted to clear the periphery of the stem, said element being a round-end detent, a releasable member separate from the element normally engaging and maintaining the element radially out, and means between the body and member functioning upon movement of the body away from the forward end of the stem to withdraw the member from the element to enable the latter to move radially into said fully retracted position; the detent being so mounted in the stem as to be capable of movement radially out from the stem a distance materially less than the radius of the round end of said detent.

2. In a clamp for sheet metal work, a body adapted at its head end for engagement with the work, a work-bore fitting stem slidable with and projecting from both ends of the body, the latter having a stem-fitting bore at its head end and a larger bore therebeyond, a head on the rear end of the stem, a compression spring about the stem between the body at the rear end of the stem-fitting bore and said head, the stem having a radial bore ahead of the body, a detent slidable in said bore adapted for radial inward movement to clear the periphery of the stem, a pin slidable in the stem and normally engaging under the detent and maintaining the same advanced and in a projecting position on the stem, a radial extension on the rear end of the pin rearwardly of the stem-fitting bore in the body and movable along a rearwardly extending longitudinal slot provided in the stem, said extension projecting radially out from the periphery of the stem and being confined between the body at the rear end of the stem bore therein and the adjacent end of the spring.

3. A device as in claim 2, with a transversely split washer about the stem seated in the body at the rear end of the stem fitting bore and forming a seat for the adjacent end of the spring; the pin extension projecting between the split ends of the washer.

WILLIAM P. LOWTHER.